July 10, 1945.  T. R. BLACK  2,380,016
COLLAPSIBLE VEHICLE
Filed Dec. 4, 1942   2 Sheets-Sheet 1
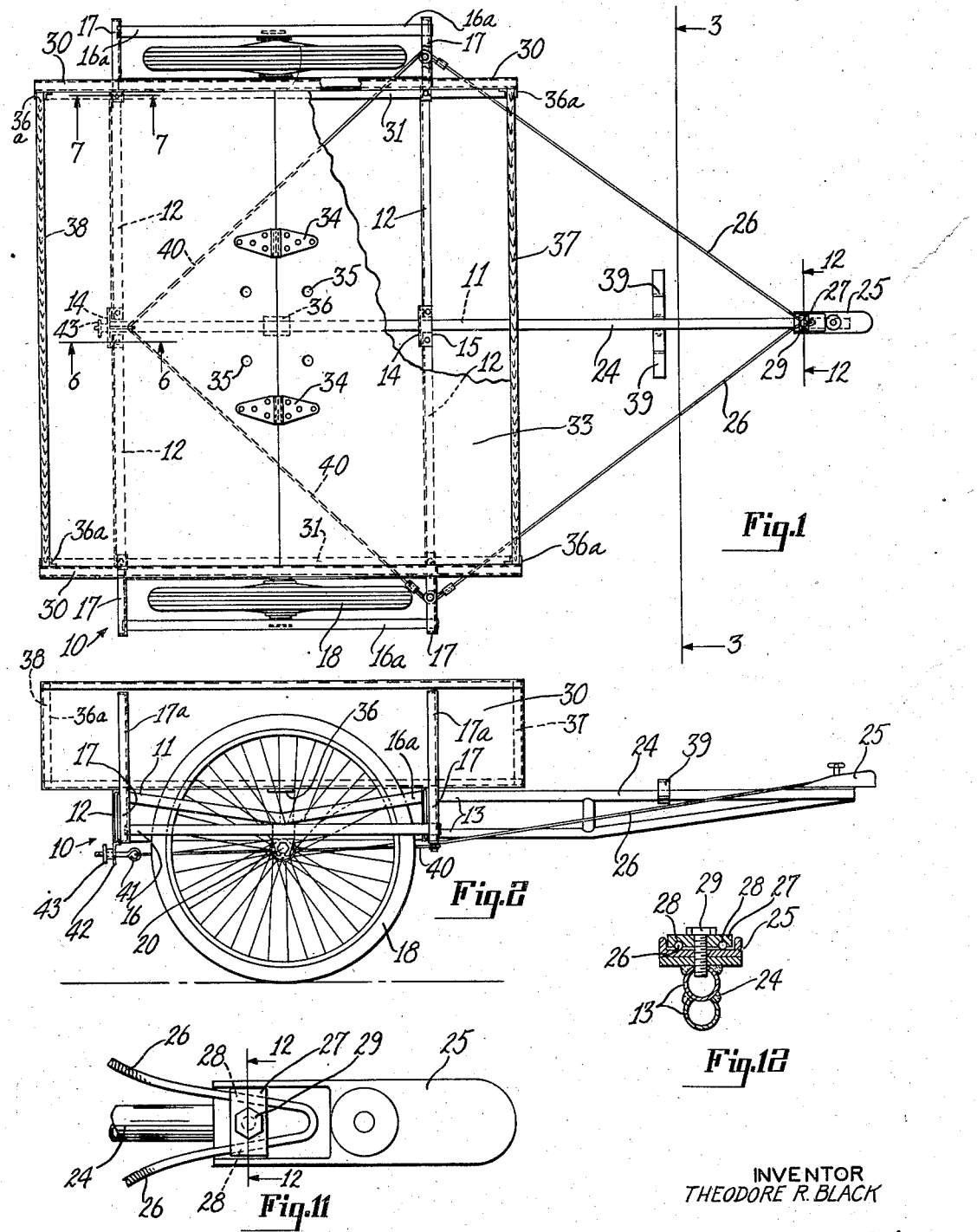
INVENTOR
THEODORE R. BLACK
BY
ATTORNEY July 10, 1945.   T. R. BLACK   2,380,016
COLLAPSIBLE VEHICLE
Filed Dec. 4, 1942   2 Sheets-Sheet 2
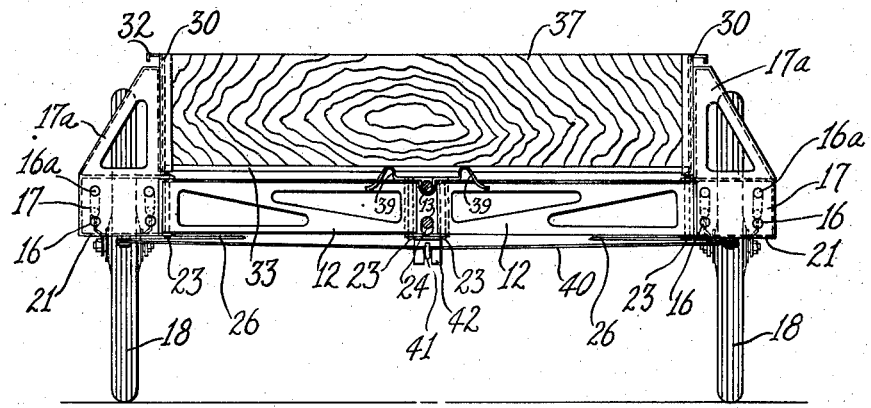
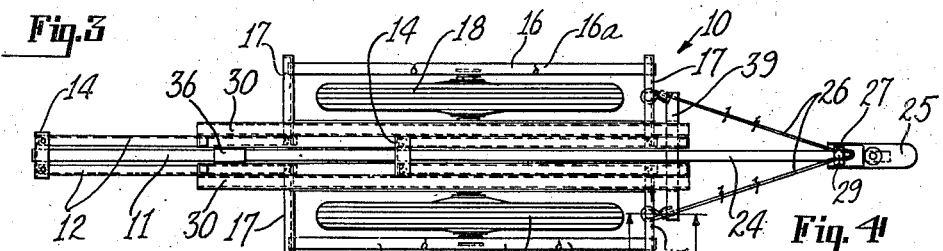
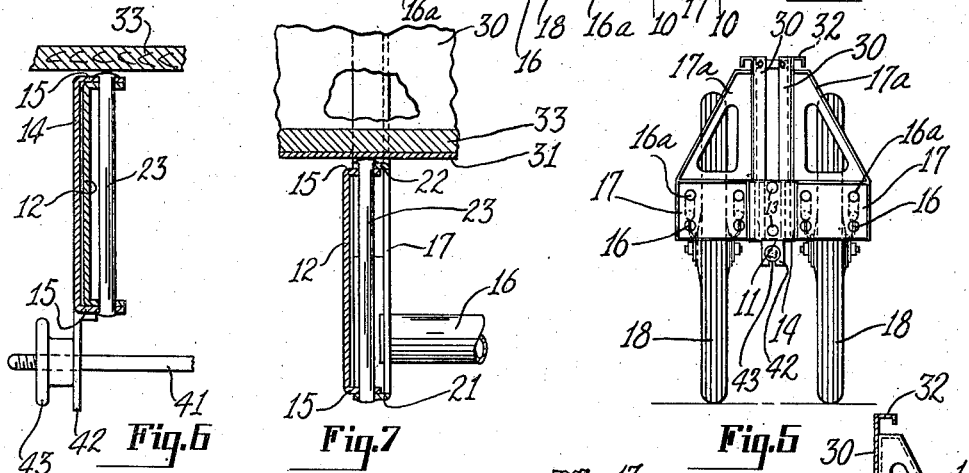
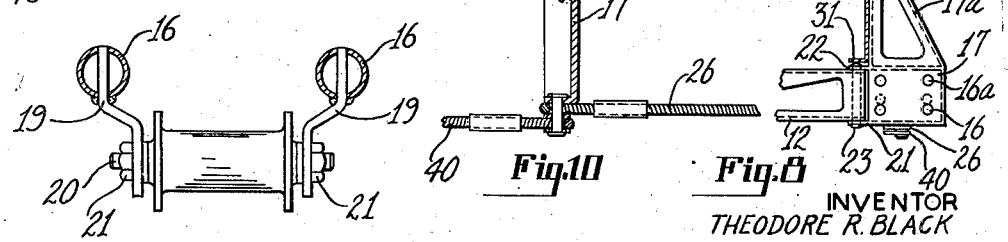
INVENTOR
THEODORE R. BLACK
BY
ATTORNEY Patented July 10, 1945

2,380,016

UNITED STATES PATENT OFFICE 2,380,016

COLLAPSIBLE VEHICLE

Theodore R. Black, Tipp City, Ohio

Application December 4, 1942, Serial No. 467,886

24 Claims. (Cl. 280—33.4)

This invention relates to a collapsible vehicle and more particularly to a collapsible trailer adapted to be connected with and towed by an automobile.

Many persons owning automobiles have occasional use for a trailer but are deterred from acquiring one by the large amount of garage space required to house the same, and the primary object of the invention is to provide a trailer which can be collapsed or folded into a compact form in which it will occupy only a relatively small space.

A further object of the invention is to provide a strong and durable collapsible trailer of simple construction which can be manufactured at a relatively low cost.

A further object of the invention is to provide such a trailer in which the wheels will be operative when in their collapsed position, to facilitate the movement of the collapsed trailer from place to place.

A further object of the invention is to provide such a trailer having simple but efficient means for retaining the wheels in positions parallel one with the other and with the line of travel when the trailer is in its normal extended position.

A further object of the invention is to provide such a trailer having the wheels mounted on separate rigid frames which are movable one toward the other.

Other objects of the invention may appear as the trailer is described in detail.

In the accompanying drawings Fig. 1 is a plan view, partly broken away, of a trailer embodying my invention, showing the same in its extended condition; Fig. 2 is a side elevation of such a trailer; Fig. 3 is a section taken on the line 3—3 of Fig. 1, showing the main structure in front elevation; Fig. 4 is a top plan view showing the trailer in its collapsed condition; Fig. 5 is an end elevation of the collapsed trailer; Fig. 6 is a sectional detail of the pivotal connection between the intermediate frame and one of the connecting members, taken on line 6—6 of Fig. 1; Fig. 7 is a sectional detail view showing the pivotal connection between one of the connecting members and the wheel unit, taken on the line 7—7 of Fig. 1; Fig. 8 is a detail view of one of the upright members of the frame of a wheel unit; Fig. 9 is a detail view showing the means for mounting the wheel on the frame of the wheel unit; Fig. 10 is a detail view showing the connection between one of the cables and the wheel unit; Fig. 11 is a top plan view of the adjustable connection between the cables and the tongue; and Fig. 12 is a section taken on the line 12—12 of Fig. 11.

In these drawings I have illustrated a preferred form of the invention and have shown the same as embodied in a light duty trailer adapted to be towed by an automobile, but it is to be understood that the invention may take various forms, that many features thereof may be embodied in collapsible vehicles other than trailers and that the vehicle may be adapted for heavy duty by increasing the strength of the various parts thereof, without departing from the spirit of the invention.

In the embodiment here illustrated the trailer comprises two wheel units 10 and a longitudinal frame 11 arranged between the wheel units and supported thereon by transverse connecting members or links 12, each of which is pivotally connected on vertical axes with one of the wheel units and with the intermediate frame, the arrangement being such that the wheel units may be moved lengthwise of the frame and toward each other to collapse the structure, and the wheels will be maintained parallel one with the other and with the frame in all relative positions of the parts. The load may be supported on the collapsible structure in any suitable manner but preferably there is provided a load support or body, a part or parts of which may be removed when the structure is to be collapsed.

The intermediate frame 11 may be of any suitable construction and as here shown it comprises two longitudinal members 13 spaced vertically one from the other and rigidly connected one with the other by transverse members 14 spaced apart lengthwise of the frame. Preferably the longitudinal members 13 are in the form of rods, and the transverse members comprise plates through which the rods extend and to which they are rigidly secured, as by welding. Each transverse member extends laterally beyond both sides of the longitudinal members 13 and is provided at its upper and lower edges with flanges 15, see Fig. 6. The wheel units may take various forms but preferably each unit comprises a rigid structure, or frame, parallel with the intermediate frame, and a wheel mounted on said structure. In the illustrated construction the frame of the wheel unit comprises two longitudinal members, such as rods 16, spaced laterally one from the other to receive the wheel between them and rigidly connected one with the other by upright members 17 located respectively in front of and behind the wheel and through which the rods extend and to which they are secured, as by welding. When the trailer is designed for heavy duty it may be desirable to reinforce the frame by mounting an upper rod 16a in the upright members 17 above each rod 16, and depressing the intermediate portion of the rod 16a and welding or otherwise rigidly securing the same to rod 16. The wheel 18 is arranged between the two frame members 16 and may be mounted thereon in any suitable manner. In the present instance brackets or clips 19, Fig. 9, are rigidly secured to the respective frame members 16 and are provided at their lower ends with openings in which is mounted the axle 20 of the wheel. Each upright member 17 is provided on its inner side and adjacent its lower end with inwardly extending and vertically spaced flanges 21 and 22 which constitute pivot lugs and in the present instance comprise the end portions of transverse flanges carried by and extending inwardly beyond the upright member. The flanged ends of each connecting member 12 extend respectively between the flanges 15 of one of the transverse members of the intermediate frame and between the flanges 21 and 22 of an upright member of the frame of the corresponding wheel unit. The flanges of the respective members are pivotally connected one to the other and, in the present instance, a single pivot pin 23 at each end of each connecting member pivotally connects the same with the intermeriate frame and the wheel unit frame, and these connections are made at corresponding distances so that the several pivoted members form similar parallelograms on opposite sides of the intermediate frame. Thus the wheel units may be moved forwardly and inwardly to positions close to the respective sides of the intermediate frame 11 and the wheels will be maintained parallel with the intermediate frame in all positions of the wheel units with relation thereto. In the present construction each wheel unit is connected with the intermediate frame by two connecting members as this provides a better support for the intermediate frame but the use of two connecting members for each wheel unit is not essential.

Suitable means are provided for so limiting the rearward movement of the wheel units with relation to the intermediate frame that they will be prevented from moving rearwardly beyond their fully extended positions. A draft member or tongue 24 is conected with an extends forwardly from the intermediate frame 11 and in the preferred construction the two members of the intermediate frame are extended forwardly beyond the wheel units to form the tongue and their forward ends are rigidly connected one with the other and provided with a coupling member 25 whereby they may be connected with the towing vehicle. The means for limiting the rearward movement of the wheel units preferably comprises flexible members 26 connected at their rear ends with the frames of the respective wheel units and at their forward ends with the tongue near the forward end of the latter. It is desirable that means should be provided for adjusting the flexible members 26 so as to maintain the wheel units in their proper positions, and the flexible members are here shown as wire cables which are adjustably connected with the tongue by a clamp comprising a fixed member, preferably a part of the coupling member 25, on which the forward ends of the cables rest, and a clamping member 27 which is provided in its lower surface with forwardly converging grooves 28 which embrace the upper portions of the cables 26. The clamping member is drawn tightly against the cables and rigidly connected with the rigid member by means of a screw or bolt 29, thereby firmly locking the cables in their adjusted positions.

The load supporting structure is here shown in the form of a body comprising side members 30 rigidly secured to and supported by the upright members 17 of the respective wheel units, these upright members being in the present instance provided with upwardly extending parts 17a to which the side walls of the body may be secured, as by welding. Each side member has at its lower edge an inwardly extending flange 31 and may, if desired, have at its upper edge an outwardly extending flange 32. The floor 33 of the body is supported by the flanges 31 of the two side members and fits snugly between those side members so that it tends to retain the two wheel units in their extended positions. This floor is removable and preferably comprises two floor boards which are connected one to the other at their adjacent edges by hinges 34 and are provided with finger holes 35, to facilitate their insertion and removal. The floor boards are also supported on the upper flanges 15 of the transverse members of the intermediate frame and on a block 36 rigidly secured to the intermediate frame beneath the abutting edges of the two boards. Each side member of the body is also provided at its respective ends with vertical guideways 36a in which are removably supported the front and rear end members 37 and 38 of the body. Detachable fastening devices may, if desired, be provided for securing the floor boards and the front and rear end members of the body to the side members thereof but I have not found this necessary in practice.

When the trailer is to be collapsed the end members 37 and 38 and the floor 33 are removed and the wheel units are pushed forwardly with relation to the intermediate frame and are thereby caused to move inwardly until they are close to the intermediate frame, as shown in Figs. 4 and 5, thus folding the trailer to a very narrow width without increasing its overall length or height. In this collapsed condition the trailer is still supported on the wheels which are parallel one with the other so that the collapsed trailer may easily be moved from place to place. It is desirable that some means be provided to retain the wheel units in their folded positions while the collapsed trailer is in storage or is being moved from place to place. Any suitable means may be provided for this purpose and, in the present instance, I have secured to the tongue 24 a pair of spring clips 39 arranged in the paths of the side members of the body as the latter move to their fully folded positions. These members are depressed by the side members and spring into engagement with the outer surfaces thereof after the side members have passed over the same, thus releasably retaining the structure as a whole in its folded condition. Means are also provided to normally prevent the tongue and intermediate frame from moving rearwardly with relation to the wheel units when the trailer is detached from the towing vehicle and is being pushed rearwardly by the tongue. This means may take various forms and as here shown comprises a cable 40 connected at its ends with the front upright members of the wheel units, the two portions of the cable converging rearwardly and being connected with the rear portion of the intermediate frame. Preferably the cable extends through an eye-bolt 41, the shank of which passes through a lug 42 on the rear transverse member 14. A nut 43 is mounted on the rear end of the bolt to enable the cable to be drawn taut and is preferably provided with a hand grip to facilitate its operation. When the trailer is to be collapsed the bolt is removed from the lug to release the cable and for this purpose the bolt opening in lug 42 is shown as a slot open at its lower end. (Fig. 4.)

It will be apparent from the foregoing description that I have provided a trailer which can be quickly and easily folded to its collapsed condition or extended to its operative condition, which in both conditions is movably supported on the wheels, which has ample strength to support the intended load and which can be produced at a relatively low cost.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a collapsible vehicle, a rigid longitudinal intermediate frame constituting a propelling element, separate wheel units spaced laterally from the respective sides of said intermediate frame and constituting the sole support therefor, laterally extending connecting members on the respective sides of said intermediate frame, having at their inner ends pivotal supporting connection with said frame and having their outer ends pivotally connected with and supported by the respective wheel units, said pivotal connections being on substantially vertical axes to permit said wheel units to move longitudinally of and toward said intermediate frame to collapsed positions, and means for retaining said wheel units in fixed spaced relation to said frame while said vehicle is being propelled by said frame.

2. In a collapsible vehicle, a rigid longitudinal intermediate frame, wheel units on opposite sides of and spaced from said frame, connecting members having at their inner ends pivotal connection with said frame and having their outer ends pivotally connected with and supported by said wheel units, said pivotal connections being on substantially vertical axes to permit said wheel units to move longitudinally of and toward said frame to collapsed positions substantially parallel with said frame, means for retaining said wheel units in fixed spaced relation to said frame while the vehicle is in motion, and a load supporting structure including parts mounted on the respective wheel units for movement therewith to collapsed positions.

3. In a collapsible vehicle, a longitudinal intermediate frame, side frames substantially parallel with and spaced from the respective sides of said intermediate frame, wheels mounted on the respective side frames, means for connecting said side frames with said intermediate frame for movement lengthwise of and toward the latter, said means comprising rigid members connected at their inner ends with said intermediate frame for movement about vertical axes and connected at their outer ends with the respective side frames for movement about vertical axes, and means to normally retain said side frames in their extended positions.

4. In a collapsible vehicle, a longitudinal intermediate frame, side frames substantially parallel with and spaced from the respective sides of said intermediate frame, wheels mounted on the respective side frames, means for connecting said side frames with said intermediate frame for movement lengthwise of and toward the latter, said means comprising rigid members connected at their inner ends with said intermediate frame for movement about vertical axes and connected at their outer ends with the respective side frames for movement about vertical axes, means to normally retain said side frames in their extended positions, said side frames having means whereby a load supporting structure may be mounted thereon.

5. In a collapsible vehicle, a longitudinal intermediate frame adapted for the application of force to propel said vehicle, two side frames substantially parallel with and spaced laterally from the respective sides of said intermediate frame, wheels mounted on the respective side frames, means for connecting said side frames with said intermediate frame for movement with relation thereto into collapsed positions and comprising two pairs of rigid members arranged respectively in front of and in the rear of the axes of said wheels, the members of each pair being connected with said intermediate frame and with the respective side frames for movement about vertical axes, and means for preventing the relative movement of said connecting members while propelling force is being applied to said intermediate frame.

6. In a collapsible vehicle, a longitudinal intermediate frame, two side frames substantially parallel with and spaced laterally from the respective sides of said intermediate frame, wheels mounted on the respective side frames, means for connecting said side frames with said intermediate frame for movement with relation thereto into collapsed positions and comprising two pairs of rigid members arranged respectively in front of and in the rear of the axes of said wheels, the members of each pair being connected with said intermediate frame and with the respective side frames for movement about vertical axes, means for normally retaining said side members in extended positions, and a load supporting structure including parts mounted on the respective side frames for movement therewith to collapsed positions.

7. In a collapsible trailer, two parallel wheel units spaced laterally one from the other, an intermediate frame arranged between said wheel units and having a part extending forwardly beyond said wheel units for connection with a towing vehicle, means for connecting said wheel units with said intermediate frame for forward movement with relation thereto into positions close to said forwardly extending part thereof and including alined connecting members pivotally mounted on said intermediate frame, extending in opposite directions therefrom and pivotally connected at their outer ends with the respective wheel units, means for normally retaining said connecting members in substantial alinement, and a load supporting structure comprising relatively movable parts mounted on the respective wheel units for movement therewith.

8. In a collapsible vehicle, an intermediate longitudinal frame, wheel units on the respective sides of and spaced from said intermediate frame, each unit including laterally spaced frame members rigidly connected one with the other and a wheel arranged between and mounted on said frame members, connecting members pivotally connected with the corresponding wheel units near the respective ends of the latter and pivotally connected with said intermediate frame, and means for normally preventing the rearward movement of said wheel units with relation to said intermediate frame.

9. In a collapsible vehicle, an intermediate longitudinal frame including vertically spaced longitudinal members and fore and aft members, each rigidly secured to both longitudinal members, wheel units spaced from the respective sides of said intermediate frame, and each including a rigid structure extending lengthwise of said intermediate frame, and a wheel mounted thereon, two pairs of rigid connecting members pivotally connected respectively with the fore and aft members of said intermediate frame, the members of each pair extending in opposite directions from said intermediate frame, and the connecting members on each side of said intermediate frame being pivotally connected with the rigid structure of the corresponding wheel unit, and means for normally preventing the rearward movement of said wheel units with relation to said intermediate frame.

10. In a collapsible vehicle, an intermediate longitudinal frame including a transverse member rigid therewith and having upper and lower flanges, wheel units each comprising a rigid structure having inwardly extending upper and lower flanges, members connecting said wheel units with said intermediate frame, each connecting member having at its ends upper and lower flanges extending between the flanges of said transverse member of said intermediate frame and of the corresponding wheel unit, pivot pins extending through said flanges at the respective ends of said connecting member, and means to normally prevent the rearward movement of said wheel units with relation to said intermediate frame.

11. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, and a load supporting structure comprising side members secured to the frames of the respective wheel units, and a movable floor fitting snugly between said side members and tending to prevent the movement of said wheel units with relation to said intermediate frame.

12. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, a load supporting structure comprising side members secured to the frames of the respective wheel units, and a movable floor fitting snugly between said side members and tending to prevent the movement of said wheel units with relation to said intermediate frame; a tongue rigid with and extending forwardly from said intermediate frame, and members connecting the respective wheel units with said tongue.

13. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, a load supporting structure comprising side members rigidly secured to the frames of the respective wheel units, a floor removably supported between said side members, and front and rear end members removably supported by said side members, a tongue extending forwardly from said intermediate frame, and means for connecting the respective wheel units with said tongue.

14. In a collapsible vehicle, an intermediate longitudinal frame, wheel units spaced from the respective sides of said intermediate frame, and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, a load supporting structure comprising side members rigidly secured to the frames of the respective wheel units, having inwardly extending parts adjacent the lower edges thereof and vertical guideways adjacent the ends thereof, a floor removably supported by said inwardly extending parts, and end members removably mounted in said guideways, a tongue extending forwardly from said intermediate frame, and means for connecting said wheel units with said tongue.

15. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, a tongue connected with and extending forwardly from said intermediate frame, and means for connecting said wheel units with the forward portion of said tongue to limit the rearward movement of said wheel units with relation to said intermediate frame.

16. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, a tongue connected with and extending forwardly from said intermediate frame, flexible members connecting the respective wheel units with the forward portion of said tongue, and means for adjusting said flexible members and securing the same in adjusted positions.

17. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, a tongue connected with and extending forwardly from said intermediate frame, flexible members connecting the respective wheel units with the forward portion of said tongue, and means for adjustably connecting said flexible members with said tongue including a fixed part and a clamping part to receive portions of said flexible members between them, one of said parts having forwardly converging grooves to embrace said portions of said flexible members, and means for securing said clamping part in clamping engagement with said flexible members.

18. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, means for normally preventing the rearward movement of said wheel units with relation to said intermediate frame, and other means for normally preventing the rearward movement of said intermediate frame with relation to said wheel units.

19. In a collapsible vehicle, an intermediate longitudinal frame, wheel units spaced from the respective sides of said intermediate frame and each comprising a frame extending lengthwise of said intermediate frame and a wheel mounted on the last mentioned frame, members connecting said wheel units with said intermediate frame, each connecting member being pivotally connected at its respective ends with said intermediate frame and with the frame of the corresponding wheel unit, means for normally preventing the rearward movement of said wheel units with relation to said intermediate frame, and a flexible device comprising members connected with the forward portions of said wheel units, converging rearwardly therefrom and connected with the rear portion of said intermediate frame.

20. In a collapsible vehicle, an intermediate longitudinal frame, wheel units spaced from the respective sides of said frame, members pivotally connected with said frame and with the respective wheel units for movement about vertical axes to permit said wheel units to be moved forwardly and inwardly with relation to said frame to collapse said vehicle, means to limit the rearward movement of said wheel units with relation to said frame when said vehicle is in its extended condition, a body comprising side members connected with the respective wheel units for movement therewith, a floor and end members arranged between said side members and removable to permit said wheel units to move toward each other, a tongue connected with said frame and extending forwardly beyond said body, and springs clips carried by said tongue and arranged to engage said side members and retain the same in their collapsed positions.

21. In a collapsible vehicle, an intermediate frame, wheel units on the respective sides of said intermediate frame, each wheel unit comprising transverse end members connected with the intermediate frame for movement about vertical axes and held against vertical movement with relation thereto, laterally spaced longitudinal members rigidly connected adjacent their ends with said transverse members, and a wheel arranged between and rotatably supported by said longitudinal members.

22. In a collapsible vehicle of the character described, a wheel unit comprising laterally spaced longitudinal members, transverse end members rigidly connected with said longitudinal members and extending upwardly therefrom, a wheel arranged between and rotatably supported by said longitudinal members, and means rigidly connected with the upper portions of said end members and with the respective longitudinal members to reinforce the latter.

23. In a collapsible vehicle of the character described, a wheel unit comprising laterally spaced longitudinal members, transverse end members rigidly connected with said longitudinal members and having parts extending upwardly from said longitudinal members to form supports for a vehicle body, and a wheel arranged between and rotatably supported by said longitudinal members, both longitudinal members being of a length greater than the diameter of said wheel.

24. In a collapsible vehicle of the character described, a wheel unit comprising transverse end members, laterally spaced longitudinal members rigidly connected with said end members, means carried by said longitudinal members for supporting a wheel between the same, and other longitudinal members rigidly connected with said end members above the respective first mentioned longitudinal members and having their intermediate portions depressed and rigidly secured to the respective first mentioned longitudinal members.

THEODORE R. BLACK.